United States Patent [19]

Swider et al.

[11] Patent Number: 4,515,911

[45] Date of Patent: May 7, 1985

[54] SELF-CROSSLINKABLE ELECTROCOAT RESINS PREPARED BY ROOM TEMPERATURE REACTIONS BY EPOXY RESINS AND POLYAMINES CONTAINING PRIMARY AND TERTIARY AMINE GROUPS

[75] Inventors: Robert A. Swider, Livonia; Martha E. Horsch, Dearborn Heights, both of Mich.

[73] Assignee: Ford Motor Company, Dearborn, Mich.

[21] Appl. No.: 563,422

[22] PCT Filed: Oct. 31, 1983

[86] PCT No.: PCT/US83/01711

§ 371 Date: Oct. 31, 1983

§ 102(e) Date: Oct. 31, 1983

[51] Int. Cl.³ ............. C08L 63/00; C08L 63/02; C09D 3/58; C09D 5/40

[52] U.S. Cl. ............. 523/414; 204/181 C; 523/402; 523/415; 523/416; 523/417; 523/420

[58] Field of Search ............. 204/181 C; 524/901; 523/402, 414, 415, 416, 417, 420

[56] References Cited

U.S. PATENT DOCUMENTS

| | | | |
|---|---|---|---|
| 3,922,253 | 11/1975 | Jerabek et al. | 528/45 |
| 3,947,338 | 3/1976 | Jerabek et al. | 204/181 R |
| 3,947,339 | 3/1976 | Jerabek et al. | 204/181 R |
| 4,036,795 | 7/1977 | Tominaga | 523/415 |
| 4,071,428 | 1/1978 | Bosso et al. | 204/181 C |
| 4,129,490 | 12/1978 | Schimmel | 204/181 C |
| 4,134,866 | 1/1979 | Tominaga | 523/415 |
| 4,137,140 | 1/1979 | Belanger | 204/181 C |
| 4,147,676 | 4/1979 | Pampouchidis | 528/45 |
| 4,148,772 | 4/1979 | Marchetti et al. | 523/414 |
| 4,179,418 | 12/1979 | Waddill | 523/401 |
| 4,182,831 | 1/1980 | Hicks | 528/103 |
| 4,190,564 | 2/1980 | Tominaga et al. | 523/415 |
| 4,225,478 | 9/1980 | Hicks | 528/120 |
| 4,225,479 | 9/1980 | Hicks | 528/120 |
| 4,274,989 | 6/1981 | Tominaga et al. | 524/901 |
| 4,297,261 | 10/1981 | Jozwiak | 523/413 |
| 4,315,044 | 2/1982 | Elmore et al. | 523/414 |
| 4,367,319 | 1/1983 | Pampouchidis et al. | 528/113 |

FOREIGN PATENT DOCUMENTS

| | | | |
|---|---|---|---|
| 2603666 | 8/1976 | Fed. Rep. of Germany | 524/901 |
| 2749776 | 5/1978 | Fed. Rep. of Germany | |
| 51-538 | 1/1976 | Japan | 524/901 |
| 1235975 | 6/1971 | United Kingdom | |
| 2038336 | 7/1980 | United Kingdom | 524/901 |

OTHER PUBLICATIONS

Room Temperature Curing Electrodeposited Coatings, North A.G., J O;1 Colour Chem. Ass. 1970, 53, 353–362.

Primary Examiner—Ronald W. Griffin
Attorney, Agent, or Firm—Lorraine S. Melotik; Roger L. May

[57] ABSTRACT

The invention relates to cathodically electrodepositable coating compositions comprising an aqueous dispersion of self-crosslinkable resin. The self-crosslinkable resin is amine and epoxide functional and prepared by reacting epoxide resin with polyamine at about room temperature, wherein at least 50 percent of the amine groups have been neutralized with water soluble acid. The polyamine contains at least one primary amine group and at least one tertiary amine group. The partially crosslinked resin product can be deposited on a metal substrate and cured at elevated temperatures to form a coating offering excellent corrosion protection and having excellent adhesion to the substrate.

20 Claims, No Drawings

SELF-CROSSLINKABLE ELECTROCOAT RESINS PREPARED BY ROOM TEMPERATURE REACTIONS BY EPOXY RESINS AND POLYAMINES CONTAINING PRIMARY AND TERTIARY AMINE GROUPS

Reference is made to concurrently filed and commonly assigned related U.S. application Ser. No. 555,676, entitled "Self-Crosslinking Electrocoat Resins Prepared by Room Temperature Reactions of Epoxy Resins and Fatty Amidopolyamines" to Swider et al.

TECHNICAL FIELD

This invention relates to water dispersible, cathodically electrodepositable, self-crosslinkable resins. More particularly, these resins are amine-functional and epoxide-functional and are the partially crosslinked, room temperature reaction product of epoxy resins and polyamines, wherein the polyamines contain at least one primary and at least one tertiary amine group.

BACKGROUND ART

The coating of electroconductive substrates by electrodeposition is an important industrial process. In this process, a conductive article is immersed as one electrode in a coating composition made from an aqueous dispersion of film-forming polymer. An electric current is passed between the article and a counter electrode in electrical contact with the aqueous dispersion until a desired amount of coating is produced on the article. The article to be coated can be made the anode or the cathode depending upon the ionic nature of the coating system.

Cationic coating compositions generally are derived from resinous compositions containing a basic nitrogen atom which can be neutralized with an acid and then be dissolved or dispsersed in water. Sufficient basic nitrogen atoms should be present so that the dispersibility or solubility can be obtained with a minimum amount of acid.

The most commonly employed type of cathodically electrodepositable resins are made by reacting polyepoxide resins with amines at elevated temperatures, as exemplified by U.S. Pat. No. 4,137,140 to Belanger and U.S. Pat. No. 4,182,831 to Hicks. Belanger teaches forming an electrocoat resin by reacting polyepoxides with polyamines and then modifying the product by reaction with a monoepoxide or a monocarboxylic acid. In the Hicks patent, the electrocoat resin is taught to be the reaction product of polyepoxides, a mixture of primary amines, and a monoepoxide. As illustrated by these patents, when forming this type of resin the amount of amine reacted with the epoxy group containing material is generally at least that amount necessary to react all the epoxide groups and form a hydroxyl amine resin. However, since these resins contain essentially no unreacted epoxide groups available for later crosslinking the amine during curing, they require a crosslinking agent which is capable of reacting with the hydroxyl or amine functionality of the resin during curing to form a thermoset film. The crosslinking agent may be present in the coating bath so as to codeposit with the resin or it may be incorporated into the resin molecule. Hicks and Belanger teach codepositing the resin with a crosslinker such as an aminoplast or phenoplast resin. On the other hand, Jerabek et al in U.S. Pat. Nos. 3,922,253 and 3,947,338 disclose reacting a partially block isocyanate with the epoxy resins and amines so as to incorporate the crosslinker into the resin molecule. That electrocoat resin product is thus able to self-crosslink during baking to form a thermoset film.

Binders for cathodic electrodeposition have been prepared by simply combining epoxy resins with amine compounds. However, aqueous dispersions of these binders are very unstable, because of the presence of free (unreacted) epoxide groups. Thus, these two component compositions are less than desirable for use as electrodepositable coatings. Such compositions are taught by Munn et al in British Pat. No. 1,235,975 and in Room Temperature Curing Electrodeposited Coatings, A. G. North, J. Oil Colour Chem. Assoc., 53 (1970) 353. While it is generally recognized in these references that stability of the compositions in the coating bath is usually limited to a few hours, one advantage of this type of coating, when compared to prior art electrodepositable coatings, is taught to be its ability to be cured at low temperatures, e.g., room temperature.

DISCLOSURE OF THE INVENTION

The coating compositions of this invention are cathodically electrodepositable and are characterized in that they comprise an aqueous dispersion of self-crosslinkable resin which contains amine groups and epoxide groups, the resin being prepared by reacting (A) epoxide resin having, on average, more than one and up to about two epoxide groups per molecule and an epoxide equivalent weight of between about 400 and about 4000, preferably between about 450 and about 2000, with (B) polyamine containing at least one primary amine group and at least one tertiary amine group per molecule and no other groups capable of reacting with the epoxide groups. The polyamine preferably contains a fatty portion which comprises between about 12 and about 36 carbon atoms. The epoxy resin and the polyamine are combined and reacted in the presence of an organic solvent in which they are mutually soluble. The reaction solution mixture comprises (i) a total of between about 70 and about 25 weight percent of reactants (A) and (B) and between about 30 and about 75 weight percent solvent. The epoxy resin and the polyamine are reacted in solution in amounts so as to provide between about 0.25 and about 1.0, preferably between about 0.5 and about 1.0 primary amine groups of (B) for each epoxide group of (A). The reaction is carried out at room temperature, i.e., at between about 18° and about 33° C., preferably between about 21° and about 27° C., for a period of time so as to react between about 20 and about 50 percent of the epoxide groups of the epoxy resin with active amine hydrogens to form partially crosslinked, self-crosslinkable resin. This partially crosslinked, self-crosslinkable resin has a weight average ($\overline{M}_w$) molecular weight of between about 1300 and about 12,000, preferably between about 2400 and about 6500.

In order to substantially limit further reaction between the epoxide and amine groups, the amine groups of the reaction mixture are neutralized with a water soluble acid in an amount sufficient to neutralize at least 50 percent, preferably greater than 90 percent, most preferably, essentially all of the amine groups present in the mixture. The resin is then dispersed in water to form a cathodically electrodepositable coating composition. The coating composition may include such commonly employed materials as plasticizing agents and catalysts. While crosslinking agents such as aminoplast resins or blocked isocyanates may also be included in the coating composition in a limited amount, it is preferable that such crosslinking agents not be included in the composition. The coating composition may be cathodically electrodeposited on a metal substrate and subjected to baking, during which it crosslinks to form a thermoset film.

Advantageously, these self-crosslinkable resins when used, for example, as a primer coating on steel possess exceptional adhesion to the steel and thus offer excellent corrosion protection for the steel.

Yet another advantage of the partially crosslinked resin of this invention is that they display excellent stability in the coating bath. It has been found that coating baths made according to the invention of this application, wherein all the amine groups have been neutralized, are stable in excess of six weeks and that coatings made from these baths have excellent film quality and corrosion resistance.

Significantly, the resins of this invention offer the advantage that they are made by simpler methods of manufacture and comprise simpler compositions than those of fully epoxide reacted resins conventionally employed in primer coatings. As described above, these conventionally employed resins additionally need a crosslinking agent for curing. Thus, the resins of this invention offer cost advantages in their manufacture, particularly since they are made from materials reacted at room temperature, wherein the reaction mixture need not be agitated during the reaction process.

BEST MODE FOR CARRYING OUT THE INVENTION

The invention of this application is directed to a cathodically electrodepositable, self-crosslinkable resin dispersed in water as has been described briefly above.

In order to form the electrodepositable, self-crosslinkable resin of the invention, an epoxy resin and a polyamine are partially reacted at room temperature in an organic solvent for both reactants. The reaction mixture is allowed to stand or may be stirred, although stirring is not necessary, for a period of time at room temperature, so as to allow the reaction to take place. When the desired number of epoxide groups have reacted, about 20-50 percent, (corresponding to a reaction time period of between about 12-36 hours), the reaction mixture is neutralized with a water soluble acid so as to limit the ongoing reaction between the epoxide and the reactive amine groups of the reactants. The amount of acid employed must be sufficient to neutralize at least 50 percent, preferably greater than 90 percent, most preferably, essentially all of the amine groups in the mixture, which amine groups are either present on the resin or on unreacted polyamine. However, it appears that essentially all of the polyamine is incorporated to some extent during the reaction period into the self-crosslinkable resin by reaction of the polyamine with some of the epoxide groups of the epoxy resin. The neutralized self-crosslinkable resin mixture is then dispersed in water to form a cathodically electrodepositable coating composition comprising the self-crosslinkable resins.

The epoxy resins useful in forming the self-crosslinkable resin of this invention have, on average, more than one and up to about two epoxide groups per molecule. These epoxy resins have an epoxide equivalent weight of between about 400 and about 4000, preferably between about 450 and about 2000. Such polyepoxide resins may be derived from a dihydric phenol or a dihydric alcohol and an epihalohydrin. Examples of epihalohydrins are epichlorohydrin, epibromohydrin and epiiodohydrin with epichlorohydrin being preferred. Dihydric phenols and dihydric alcohols are exemplified by resorcinol, hydroquinone, Bisphenol A, p,p'-dihydroxy benzol phenone, p,p'-dihydroxy phenol, p,p'-dihydroxy diphenol ethane, bis-(2-hydroxy naphtha) methane, 1,5-dihydroxy naphthaline, ethylene glycol, propylene glycol, 1,4-butane diol, hydrogenated Bisphenol A, 1,4-cyclohexane diol, 1,3- cyclopentane diol, cyclohexane dimethanol, and the like. These polyepoxide resins are well known in the art and are made in the desired molecular weights by reacting the epihalohydrin and the diols in various ratios, or by reacting a dihydric phenol with a lower molecular weight polyepoxide resin. Preferred polyepoxide resins are the glycidyl polyethers of Bisphenol A having the equivalent weight stated above. Examples of epoxy resins which are commercially available and suitable for use in this invention include Epon 1001F, 1002F, 1004F, 1007F, 1009F, available from and a trademark of Shell Chemical Company (Houston, Tex., Araldite 6084, 6097, 6099 7072 and 7097 available from Ciba-Geigy (Ardsley, N.Y.), and DER 661, 664, 667 and 669 Available from Dow Chemical Company (Midland, Mich. Mixtures of these epoxy resins may also be employed as the epoxy resin reactant useful in forming the self-crosslinking resin of this invention.

The polyamines used in this invention contain at least one primary amine group and at least one tertiary amine group per molecule. The polyamine may also contain secondary amine groups. Preferably, the polyamine contains two primary amine groups and, only one tertiary amine group. During the formation of the self-crosslinkable resin, reaction will take place between active amine hydrogens of the polyamine and epoxide groups of the epoxy resin. In a preferred embodiment, the polyamine, is a fatty polyamine, wherein the fatty portion of the fatty polyamine comprises between about 12-36 carbon atoms, preferably between about 12-18 carbon atoms, most preferably between about 16-18 carbon atoms. The fatty portion may be straight chain or branched, and may be substituted with non-interfering functionality.

The polyamine may not contain any other type of functionality which could react with the epoxide groups of the epoxy resin. That is, no other functionality should be present on the polyamine which would interfere with the reaction of the amine and epoxide groups of the reactants of the mixture. However, groups not reactive with epoxide may be included in the polyamine. One such group which may be present is amide.

Preferably, the polyamine has a weight average ($\overline{M}_w$) molecular weight of between about 300 and about 1000, more preferably between about 350 and about 550. Suitable commercially available polyamines which may be employed in this invention include 3-dimethylamino propylamine and 3-diethylamino propylamine with 3-dimethylamino propylamine being preferred. Other polyamines may include diethylaminobutylamine, dibutylaminoethylamine, etc., (available from and a trademark of BASF Wyandotte Corp., Wyandotte, Mich.). Suitable commercially available fatty polyamine which may be employed in this invention include N-Tallow Bis(aminopropyl) amine (XC95) from Henkel Corporation, Minneapolis, Minn. Mixtures of polyamines as described above could also be employed in this invention as the polyamine reactant.

The epoxy resin and the polyamine are combined in the reaction mixture in amounts so as to provide between about 0.25 and about 1.0, preferably between about 0.5 and about 1.0 primary amine groups present on the polyamine for each epoxide group present on the epoxide resin. The reactants are dissolved in an organic solvent in which both reactants are soluble. The reaction mixture comprises (i) between about 30 and about 75 weight percent solvent and (ii) a total of between about 70 and about 25 weight percent reactants (A) and (B), preferably between about 40 and about 60 weight percent solvent and between about 60 and about 40 weight percent total of reactants (A) and (B). The reaction temperature of the mixture is between about 18° and about 33° C., preferably between about 21° and about 27° C.

Suitable solvents include alcohols, ethers, ketones, as well as aromatic hydrocarbons and phthalates. Exemplary of the alcohols are butanol, isopropanol, hexanol, etc. Ethers which may be used include, but are not limited to, propylene glycol methyl ether, dipropylene glycol methyl ether and ethylene glycol ether acetate, with the cellosolve type ethers being preferred. Ketones which may be so employed include methyl butyl ketone, methylisobutyl ketone, methyl propyl ketone, methyl ethyl ketone, etc. Useful aromatic solvents include xylene, toluene, ethyl benzene, etc. Phthalates useful as solvents in this invention include dimethyl, dipropyl, dibutyl, and dioctyl phthalates. Preferably, blends of such solvents are employed as the solvent in this invention. While solvents which may be used have been disclosed above, this disclosure is not meant to be limiting. Other suitable organic solvents which may be used to dissolve the reactant and form the reaction mixture will be apparent to those skilled in the art.

As has been stated above, the reactants are reacted for a period of time so as to react between about 20 and about 50 percent of the epoxide groups present in the reaction mixture. The completeness of the epoxide reaction can be determined by means such as Infrared Absorption. At the desired percent conversion of epoxide groups, the amine groups present in the reaction mixture are neutralized with water soluble acid. The amount of acid used must be more than that needed to simply disperse the resin. Rather, sufficient acid must be employed so as to neutralize at least 50 percent, preferably greater than 90 percent, most preferably, essentially all of the amine groups in the mixture. This neutralizing substantially limits or, in the most preferred embodiment where essentially all the amine groups are neutralized, stops any further reaction of amine and epoxide groups. Acids which may be so employed include water soluble monocarboxylic acids such as formic, propionic, lactic, acetic, and butanoic, just to name a few, with lactic acid being preferred.

Optionally, other commonly employed materials may be included in the coating composition comprising the dispersed self-crosslinkable resin disclosed in this application. These optional constituents are generally mixed into the reaction mixture prior to the addition of the water soluble acid although they may be added after the addition of the acid. Such optional constituents include, but are not limited to, plasticizers, pigments, catalysts and crosslinking agents. Such plasticizers include dioctylphthalate, polyhydroxy polyethers (e.g., Eponol 52B40 or Eponol 57B40, Shell Chemical, Houston, Tex., hydroxy acrylate (e.g., G-Cure 868 Rohm & Haas Company, Philadelphia, Pa.), etc. Pigments when included generally comprise up to about 4 weight percent of the coating composition bath. Crosslinking agents may include blocked polyisocyanates, aminoplast resins or phenoplast resins. Thus, in addition to the resins ability to self-thermoset, the amine and hydroxyl group of the resin (the hydroxyl being produced by the amine-epoxide reactions) can crosslink with blocked isocyanate at elevated temperatures to form polyurethane and polyurea. The hydroxyl groups can also crosslink with aminoplast or phenoplast crosslinkers at elevated temperatures. However, while crosslinking agents may be included in the coating composition, it is preferred not to employ any additional crosslinking agents. It has been found that the cationic self-crosslinking resin coatings of this invention, when used without additional crosslinking agents, posess greater throwing power than such cationic coating compositions which contain additional crosslinking agents. If however, additional crosslinking agents are employed, they would preferably not comprise more than 6.5 weight percent of the coating bath. Selection of such commonly employed crosslinking agents of the types mentioned above, will be well within the skill of one in the art.

The coatings comprising the dispersed resin of this invention may be coated onto metal substrates by cathodic electrodeposition methods well known to those skilled in the art. Generally, voltages of between about 300 and about 400 volts are employed for between about 2 and about 3 minutes so as to provide coatings between about 12 and about 40 microns. Selection of optimal coating condition would be well within the skill of one in the art, and those described above are not meant to be limiting to the invention of this application.

The invention will be further understood by referring to the following detailed examples. It should be understood that the specific examples are presented by way of illustration and not by way of limitation.

EXAMPLE 1

A fatty tertiary amine group containing self-crosslinking amine epoxy cathodic electrocoat primer was prepared as follows:

| (A) | 445 grams | Epon 1007F[1] and |
|---|---|---|
| (B) | 111 grams | Epon 1001F[1] were dissolved in a mixture of |
| (C) | 414 grams | Dowanol DPM[2], |
| (D) | 114 grams | Hexylcellosolve, and |
| (E) | 130 grams | Dioctylphthalate. |
| (F) | 44 grams | N-Tallow bis(amino propyl) amine having an amine equivalent weight of 95 were reacted with the resin solution (A)-(E) for 16 hours at room temperature (about 22°-25° C.). Immediately afterwards |
| (G) | 152 grams | Eponol 53B40 (Shell Chemical) were added to the reacted resin from (F), and immediately thereafter |
| (H) | 47.3 grams | 88% lactic acid were worked into the reacted resin mixture from (F) to neutralize all the amine groups in the reaction mixture. |
| (I) | 30 grams | carbon black were worked into (H) using various blending methods (ball milling, roll milling, etc.) The pigmented resin mixture from (I) was dispersed with deionized |

-continued water to a 4000 gram coating bath.

[1] Trademark of Shell Chemical Company
[2] Trademark Dow Chemical Company, Midland, MI.

The bath was placed in a stainless steel container and stirred for at least 24 hours. A zinc phosphated steel panel cathode electrode was coated at 350 volts for 2 minutes at 23° C. After the panel is baked at 180° C. air temperature for 25 minutes, the panel had a 17.8 micron thick coating. Additional panels were similarly coated and baked and then salt spray tested according to ASTM Test Method B-117. The panels after 500 hours testing showed no signs of failure. The bath from (I) showed excellent stability in excess of six weeks and provided cured coatings with excellent film quality and corrosion resistance.

EXAMPLE 2

A fatty tertiary amine group containing self-crosslinking amine epoxy cathodic electrocoat primer paint was prepared as follows:

| (A) | 387 grams | Epon 1009F[1] and |
| (B) | 166 grams | Epon 1001F[1] were dissolved into a mixture of |
| (C) | 414 grams | Dowanol DPM[2], |
| (D) | 114 grams | Hexylcellosolve, and |
| (E) | 130 grams | Dioctylphthalate. |
| (F) | 47 grams | Fatty amine, N-Tallow bis(aminopropyl) amine were reacted at 23° C. with the resin solution (A)-(E) for about 16 hours. Immediately afterwards |
| (G) | 152 grams | Eponol 53B-40 (Shell Chemical) were added to the reacted resin from (F). |
| (H) | 47 grams | 88% lactic acid were worked into the mixture from (G) to neutralize all the amine groups. |
| (I) | 60 grams | Alcoblak 338[3] carbon black pigment were worked into the neutralized reaction mixture from (H). Deionized water was worked into the pigmented resin mixture from (I) to prepare 4000 grams electrocoat bath. |

[1] Trademark of Shell Chemical Company
[2] Trademark Dow Chemical Company, Midland, MI.
[3] Trademark of Borden Chemical, Cincinnati, Ohio.

The bath from (I) was placed in a stainless steel container and stirred for at least 24 hours. As in Example 1, a zinc phosphate panel used as the cathode, was coated in the bath at 300 volts for 2½ minutes. After baking the panel at 180° C. for 25 minutes, the panel had a 22.5 micron thick coating. Additional panels that were coated and baked as above showed no signs of failure after 500 hours salt spray testing.

EXAMPLE 3

The same bath was prepared as in Example 2 except that the lactic acid of (H) is replaced with 27.4 gram of acetic acid.
Zinc phosphated panels were coated as in Example 2. After baking the coated panels for 25 minutes at 150° C., the panels had 20.5 micron thick coatings. The panels showed 500 hours resistance to salt spray corrosion.

EXAMPLE 4

A cathodic self-crosslinking electrocoat paint was prepared as follows:

| (A) | 545.5 grams | Epon 1004F[1] are dissolved in a mixture of |
| (B) | 414 grams | Propylene glycol methyl ether, |
| (C) | 114 grams | Hexylcellosolve, and |
| (D) | 130 grams | Dibutylphthalate. |
| (E) | 54.5 grams | N-Tallow bis(amino propyl) amine are reacted with the resin solution (A)-(D) for 18 hours at about 20°-25° C. Immediately afterwards |
| (F) | 76 grams | Eponol 528-40 (Shell Chemical) are added to the resin from (E). Immediately afterwards |
| (G) | 58.7 grams | 88% lactic acid are worked into the resin mixture from (F) to neutralize all the amine groups in the mixture. |
| | 30 grams | Carbon black are worked into the resin from (G). Deionized water is worked into the resin mixture from (H) until a 4000 gram bath is yielded. |

[1] Trademark of Shell Chemical Company

The bath from (H) is placed into a steel container and placed under mild agitation by stirring. Zinc phosphate panels, electrocoated at 300 volts for 2½ minutes at 27° C. and baked at 180° C. for 20 minutes, had 18.5 micron thick coatings. The bath also displayed excellent corrosion protection for more complex shaped electrocoated zinc phosphated articles.

EXAMPLE 5

A fatty tertiary amine reacted self-crosslinkable epoxy cathodic electrocoat primer paint was prepared as follows:

| (A) | 545.5 grams | Epon 1004F[1] were dissolved in a mixture of |
| (B) | 414 grams | Dowanol DPM[2], |
| (C) | 114 grams | Hexylcellosolve, and |
| (D) | 130 grams | Dioctylphthalate. |
| (E) | 54.5 grams | N-Tallow bis(amino propyl) amine were reacted with the resin mixture were reacted with the resin mixture from (A)-(D) for 16 hours at 23° C. to about 25° C. Immediately afterwards |
| (F) | 61.5 grams | Desmodur 2412, blocked diisocyanate crosslinking agent (Mobay Chemical of Pittsburgh, PA.) were worked into the reaction mixture from (E). |
| (G) | 34.3 grams | Acetic acid are worked into the resin from (F) to neutralized the amine groups. |
| (H) | 30 grams | Carbon black are worked into the resin from (G). Deionized water is added to the paint paste from (H) until a 4000 gram emulsion paint bath is obtained. |

[1] Trademark of Shell Chemical Company
[2] Trademark Dow Chemical Company, Midland, MI.

The bath from (H) was placed into a stainless steel container. As in Examples 1 through 4, a zinc phosphated steel panel was cathodically electrocoated and then baked at 180° C. for 25 minutes, the panels had a 15.3 micron thick coating. The coatings provide excellent resistance against corrosion after being exposed to salt spray test conditions for 500 hours. Throw power tests conducted on a scaled up batch of the paint showed lower throw power than its self-crosslinking counterpart, shown in Examples 1 through 4.

EXAMPLE 6

A fatty tertiary amine reacted epoxy cathodic electrocoat paint primer was prepared as in Example 5, except the blocked diisocyanate crosslinker in (F) of Example 5, was replaced by a urea formaldehyde resin Beetle 80 crosslinking agent, manufatured by American Cyanamide of Wayne, N.J.

The bath prepared in Example 6 is placed in a stainless steel container and agitated by mild stirring. As in Example 1 through 5, zinc phosphated steel panel electrode cathodes are coated at 300 volts for 2½ minutes and 23°–25° C. After baking at 180° C. for 25 minutes, the panels had 20.3 micron thick coatings which passed accelerated laboratory test for electrocoat primer paints.

EXAMPLE 7

A fatty tertiary amine group containing self-crosslinking unstable amine epoxy cathodic electrocoat primer was prepared as follows:

| (A) | 445 grams | Epon 1007F[1] and |
|---|---|---|
| (B) | 111 grams | Epon 1001F[1] were dissolved in a mixture of |
| (C) | 414 grams | Propylene glycol methyl ether, |
| (D) | 114 grams | Hexylcellosolve, and |
| (E) | 130 grams | Dioctylphthalate. |
| (F) | 44 grams | N-Tallow bis(amino propyl) amine were worked into the resin solution from (A)-(E) as in Example 1. This reaction mixture was permitted to stand for 18 hours at 23°–25° C. Immediately afterwards, |
| (G) | 23.7 grams | 88% lactic acid (that amount of acid required to neutralize about half of the amine groups of the mixture) were blended into the resin mixture from (F). |
| (H) | 30 grams | Carbon black are blended into the partially neutralized resin from (G). Deionized water was worked into the pigmented, partially neutralized paint from (H), to give a 4000 gram coating bath. |

[1]Trademark of Shell Chemical Company

The bath from (H) was placed into a stainless steel container and stirred for at least 24 hours. A zinc phosphated steel panel cathode was coated at 350 volts for 2 minutes and then baked at 180° C. for 25 minutes. The baked panel had a 20 micron thick, glossy, smooth, coating which showed no signs of failure after 500 hours salt corrosion testing. After the bath was stirred for about 3 weeks, another zinc phosphated steel panel cathode electrode was coated in the bath. The baked panel (180° C. for 25 minutes) yielded a non-uniform, thick, rough, non-glossy coating. The coating also showed poor adhesion to the steel substrate and failed 500 hour salt spray corrosion testing.

INDUSTRIAL APPLICABILITY

It should be apparent from the foregoing, that the cathodically electrodepositable coating compositions of this invention find application as, for example, primer coatings for metals to prevent corrosion.

In view of the disclosure, many modifications of this invention will be apparent to those skilled in the art. It is intended that all such modifications which fall within the true scope of this invention be included within the terms of the appended claims.

We claim:

1. A cathodically electrodepositable coating composition characterized in that it comprises an aqueous dispersion of self-crosslinkable resin bearing amine and epoxide functionalities and being prepared by reacting:
   (A) epoxy resin having (a) on average, more than one and up to about two epoxide groups per molecule, and (b) an epoxide equivalent weight of between about 400 and about 4000; and
   (B) polyamine containing at least one primary amine group and at least one tertiary amine group per molecule and no other groups capable of reacting with epoxide groups,
(1) in a reaction mixture comprising between (i) a total of about 70 and about 25 weight percent of reactants (A) and (B) and (ii) between about 30 and about 75 weight percent organic solvent for said reactants, (2) in amounts so as to provide between about 0.25 and about 1.0 primary amine groups of (B) per each epoxide group of (A), (3) at a reaction mixture temperature of between about 18° and about 33° C., and (4) for a period of time sufficient to react between about 20 and about 50 percent of said epoxide groups with active amine hydrogens to form an amine and epoxide functional, partially crosslinked resin having a weight average ($\overline{M}_w$) molecular weight of between about 1300 and about 12,000, and subsequently neutralizing amine groups present in said reaction mixture with water soluble acid in an amount sufficient to neutralize at least about 50 percent of said amine groups present therein, and thereafter dispersing said resin in water.

2. A cathodically electrodepositable coating composition according to claim 1, wherein said water soluble acid is employed in an amount sufficient to neutralize greater than 90 percent of said amine groups present therein.

3. A cathodically electrodepositable coating composition according to claim 2, wherein said water soluble acid is employed in an amount sufficient to essentially completely neutralize all of said amine groups present therein.

4. A cathodically electrodepositable coating composition according to claim 1, wherein said epoxy resin is selected from the group consisting of polyglycidyl ethers of Bisphenol A and mixtures thereof.

5. A cathodically electrodepositable coating composition according to claim 1 wherein said epoxy resin has an equivalent weight of between about 450 and about 2000.

6. A cathodically electrodepositable coating composition according to claim 1, wherein said polyamine is a fatty polyamine, wherein said fatty portion of said fatty polyamine comprises a $C_{12}$–$C_{36}$ group.

7. A cathodically electrodepositable coating composition according to claim 6, wherein said fatty portion of said fatty polyamine comprises a $C_{12}$–$C_{18}$ group.

8. A cathodically electrodepositable coating composition according to claim 1, wherein said polyamine has a weight average ($\overline{M}_w$) molecular weight of between about 300 and about 1000.

9. A cathodically electrodepositable coating composition according to claim 1, wherein said polyamine contains two primary amine groups.

10. A cathodically electrodepositable coating composition according to claim 1, wherein said polyamine contains one tertiary amine group.

11. A cathodically electrodepositable coating composition according to claim 1, wherein said reaction mixture comprises (i) a total of between about 40 and about 60 weight percent said reactants (A) and (B) and (ii) between about 60 and about 40 weight percent said solvent.

12. A cathodically electrodepositable coating composition according to claim 1, wherein said organic solvents are selected from the group consisting of alcohols, ethers, ketones, aromatic hydrocarbons, phthalates and mixtures thereof.

13. A cathodically electrodepositable coating composition according to claim 12, wherein said organic solvent comprises cellosolve ether compounds.

14. A cathodically electrodepositable coating composition according to claim 1, wherein said reaction mixture temperature is between about 21° and about 27° C.

15. A cathodically electrodepositable coating composition according to claim 1, wherein said epoxy resin and said polyamine are combined in said reaction mixture in amounts so as to provide between about 0.5 and about 1.0 primary amine groups of (B) per each epoxide group of (A).

16. A cathodically electrodepositable coating composition according to claim 1, wherein said resin product has a weight average ($\overline{M}_w$) molecular weight of between about 2400 and about 6500.

17. A cathodically electrodepositable coating composition according to claim 1, wherein said water soluble acid comprises one or more water soluble monocarboxylic acids.

18. A cathodically electrodepositable coating composition according to claim 1, wherein said coating composition further comprises crosslinking agents selected from the group consisting of blocked isocyanates, amine aldehyde resins and phenoplast resins.

19. A process for the preparation of a cathodically electrodepositable coating composition comprising an aqueous dispersion of self-crosslinkable resin bearing amine and epoxide functionalities characterized in that it comprises reacting:

(A) epoxy resin having (a) on average, more than one and up to about two epoxide groups per molecule, and (b) an epoxide equivalent weight of between about 400 and about 4000; and (B) polyamine containing at least one primary amine group and at least one tertiary amine group per molecule and no other groups capable of reacting with epoxide groups, (1) in a reaction mixture comprising (i) a total of between about 70 and about 25 weight percent of reactants (A) and (B) and (ii) between about 30 and about 75 weight percent organic solvent for said reactants, (2) in amounts so as to provide between about 0.25 and about 1.0 primary amine groups of (B) per each epoxide group of (A), (3) at a reaction mixture temperature of between about 18° and about 33° C., and (4) for a period of time sufficient to react between about 20 and about 50 percent of said epoxide groups with active amine hydrogens to form an amine and epoxide functional, partially crosslinked resin having a weight average ($\overline{M}_w$) molecular weight of between about 1300 and about 12,000, and subsequently neutralizing the amine groups present in said reaction mixture with water soluble acid in an amount sufficient to neutralize at least about 50 percent of said amine groups present therein, and thereafter dispersing said resin in water.

20. A process for the preparation of a cathodically electrodepositable coating composition according to claim 19, wherein said water soluble acid is employed in an amount sufficient to neutralize greater than 90 percent of said amine groups present therein.

* * * * *

UNITED STATES PATENT AND TRADEMARK OFFICE
CERTIFICATE OF CORRECTION

PATENT NO. : 4,515,911

DATED : May 7, 1985

INVENTOR(S) : Robert A. Swider et al

It is certified that error appears in the above-identified patent and that said Letters Patent are hereby corrected as shown below:

On the cover sheet, Item [54] should read:

Self-Crosslinkable Electrocoat Resins Prepared By Room Temperature Reactions Of Epoxy Resins and Polyamines Containing Primary And Tertiary Amine Groups Signed and Sealed this Twenty-second Day of October 1985

[SEAL]

Attest:

DONALD J. QUIGG

Attesting Officer

Commissioner of Patents and Trademarks—Designate